(No Model.) 5 Sheets—Sheet 1.
J. W. R. JOHNSON.
MACHINE FOR CUTTING, POINTING, AND SHAPING RODS.
No. 489,586. Patented Jan. 10, 1893.
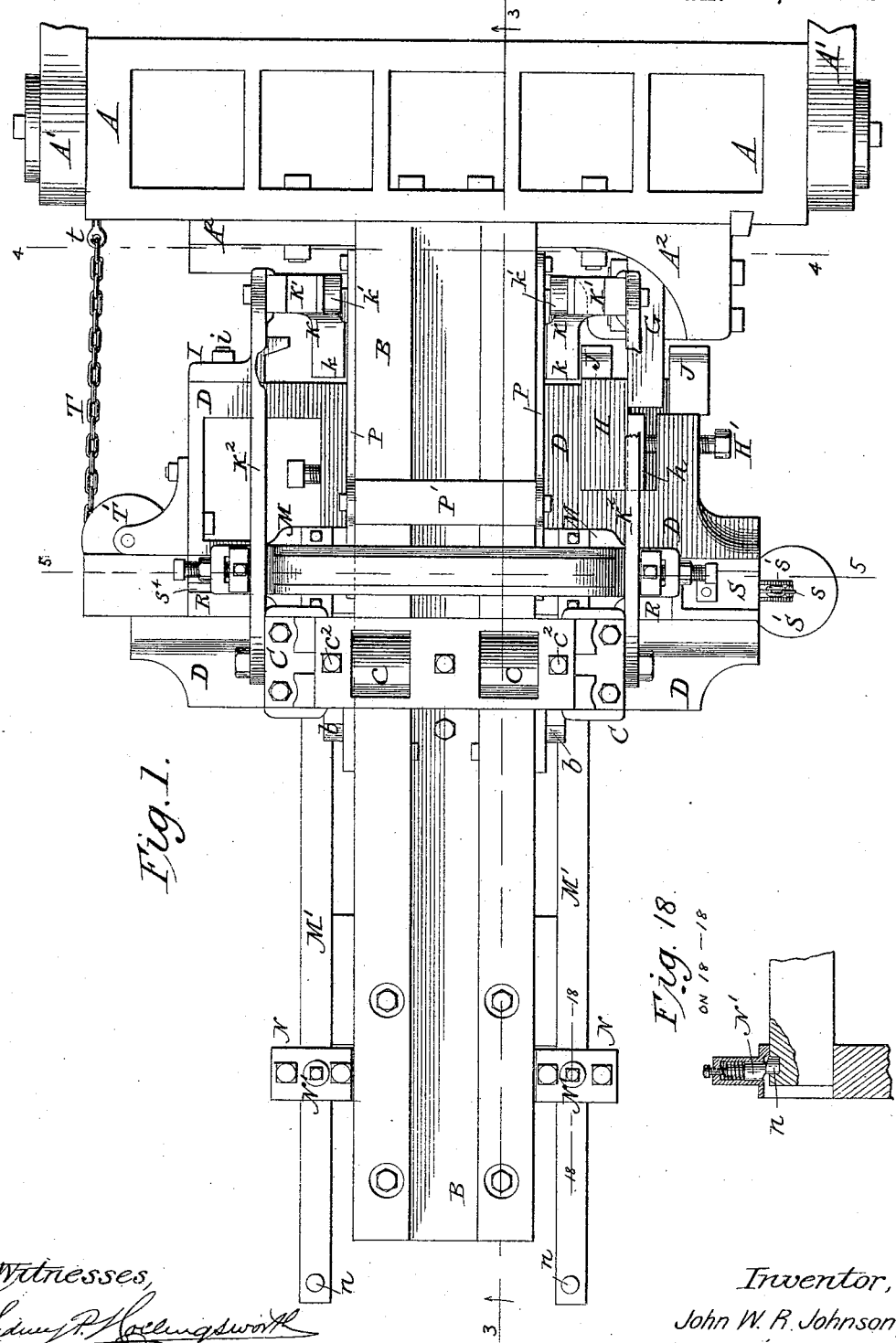

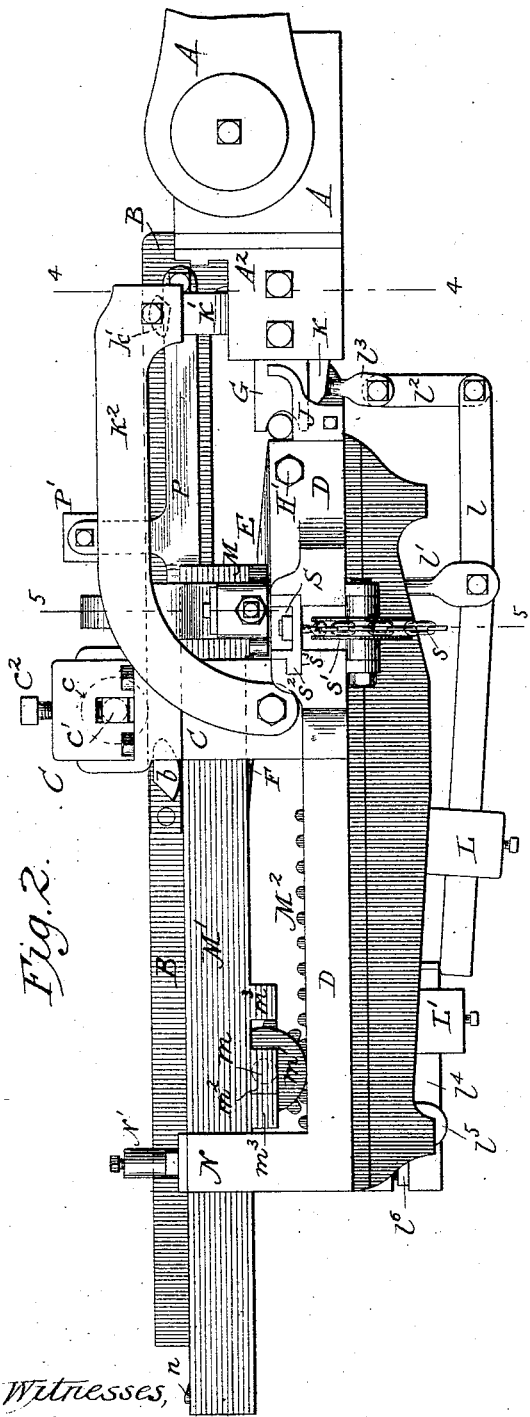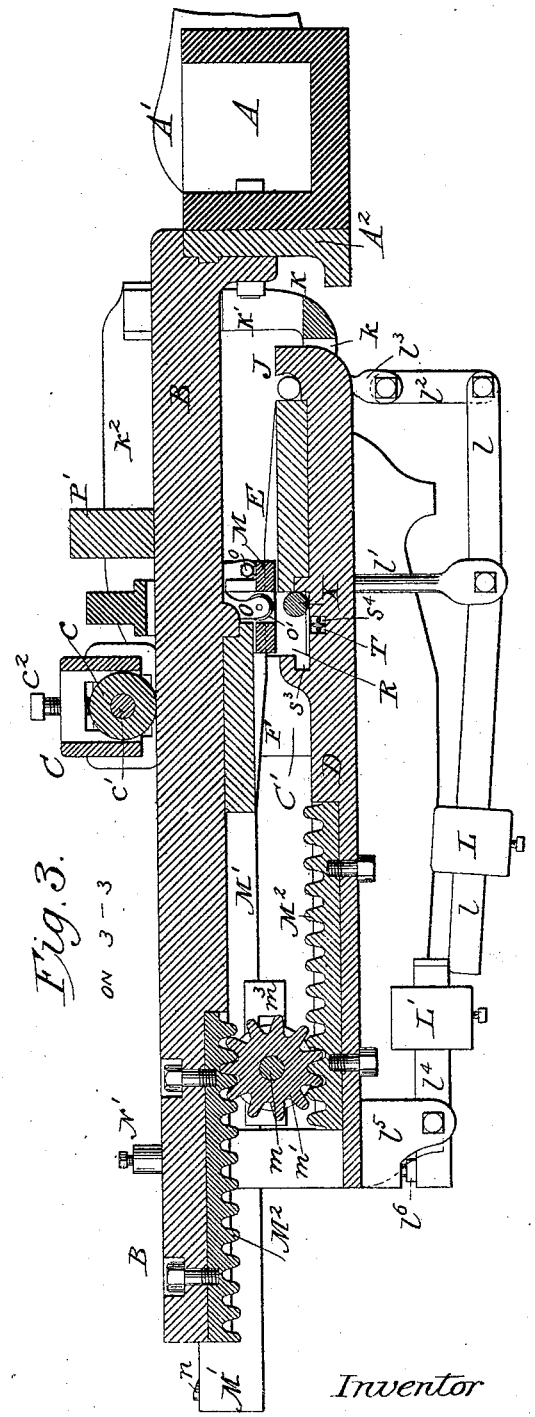

(No Model.) 5 Sheets—Sheet 3.

J. W. R. JOHNSON.
MACHINE FOR CUTTING, POINTING, AND SHAPING RODS.

No. 489,586. Patented Jan. 10, 1893.

Witnesses:

Inventor:
John W. R. Johnson
by his attorneys,

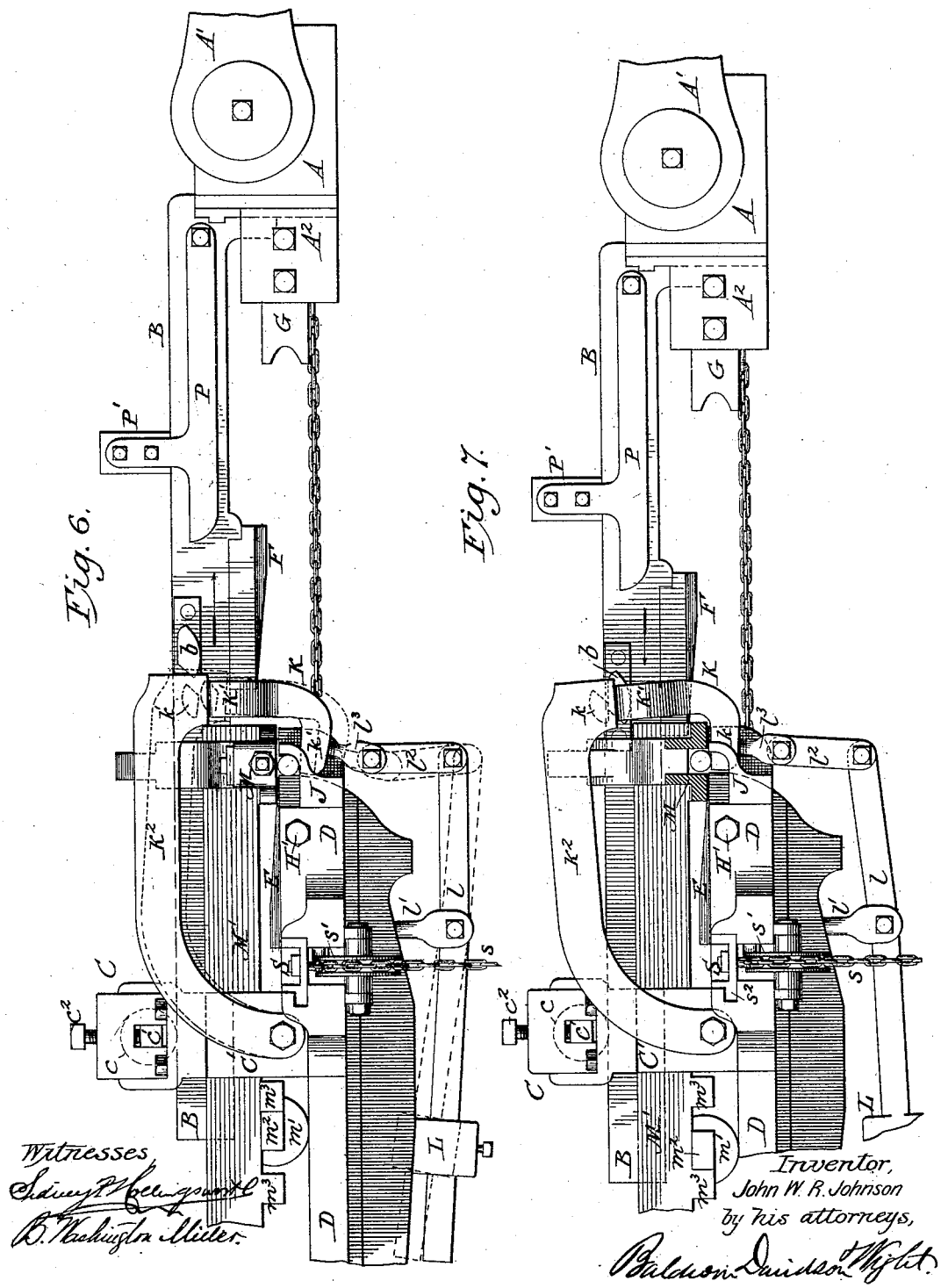

(No Model.) 5 Sheets—Sheet 5.
J. W. R. JOHNSON.
MACHINE FOR CUTTING, POINTING, AND SHAPING RODS.
No. 489,586. Patented Jan. 10, 1893.
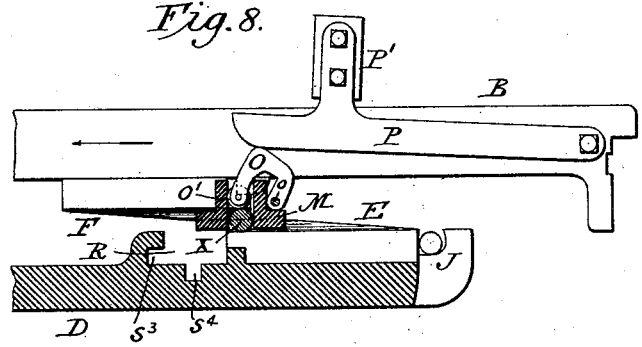
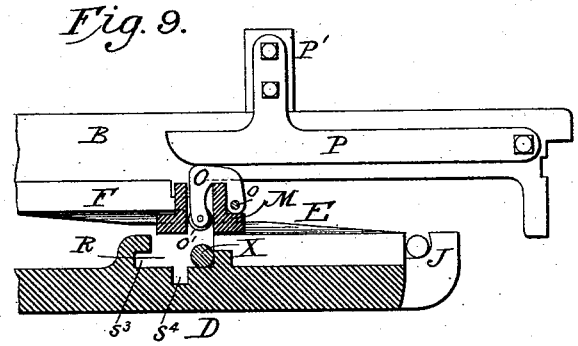
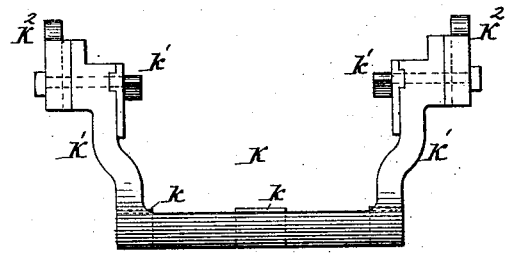
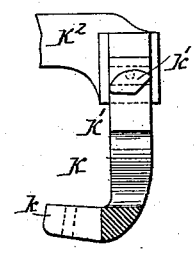
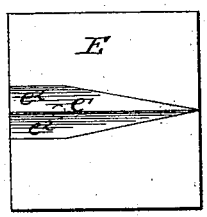
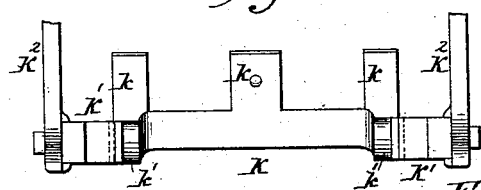
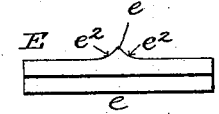
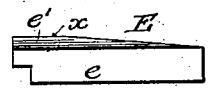
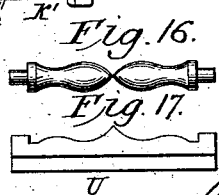
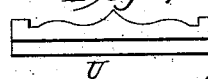
Witnesses;
Inventor;
John W. R. Johnson
by his attorneys

UNITED STATES PATENT OFFICE.

JOHN W. R. JOHNSON, OF RICHMOND, VIRGINIA, ASSIGNOR TO THE TREDEGAR COMPANY, OF SAME PLACE.

MACHINE FOR CUTTING, POINTING, AND SHAPING RODS.

SPECIFICATION forming part of Letters Patent No. 489,586, dated January 10, 1893.

Application filed July 12, 1892. Serial No. 439,818. (No model.)

*To all whom it may concern:*

Be it known that I, JOHN W. R. JOHNSON, a citizen of the United States, residing at Richmond, in the county of Henrico and State of Virginia, have invented certain new and useful Improvements in Machines for Cutting, Pointing, and Shaping Rods, of which the following is a specification.

My invention relates to that class of machines in which coupling pins and similar articles are manufactured from metal rods.

The object of my invention is to so construct machines of this class that they shall operate most efficiently and rapidly and shall be strong and durable.

My invention consists in the improved devices and organization of instrumentalities, and in the details of construction hereinafter set forth and claimed.

Figure 4:
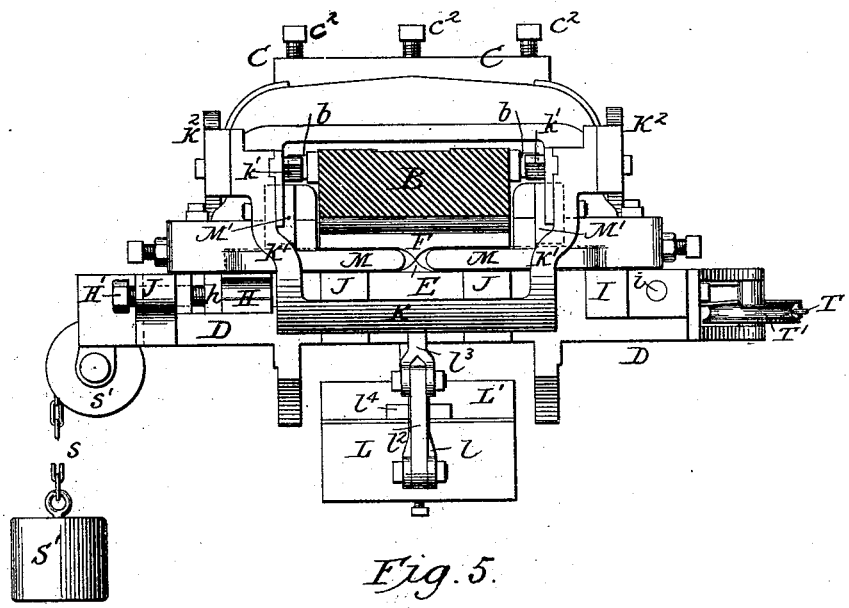
Figure 5:
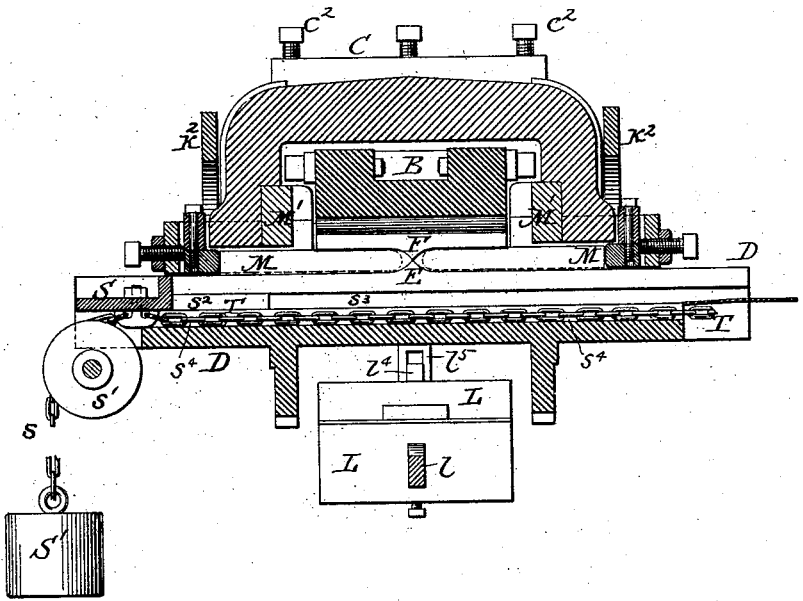

In the accompanying drawings,—Figure 1 is a plan view of my improved machine. Fig. 2 is a side elevation thereof. Fig. 3 is a longitudinal section on the line 3—3 of Fig. 1. Fig. 4 is a transverse section on the line 4—4 of Figs. 1 and 2. Fig. 5 is a transverse section on the line 5—5 of Figs. 1 and 2. Fig. 6 is a side elevation of part of the machine, showing the relative position of the parts at the end of the back stroke. Fig. 7 is a similar view showing the relative position of the parts as they appear at the beginning of the front stroke. Fig. 8 is a detail view, partly in elevation and partly in section, illustrating the details of the devices for detaching or stripping the pins from their carrier. Fig. 9 is a similar view with the parts in different positions. Figs. 10, 11 and 12 are detail views of the lifter. Figs. 13, 14 and 15 are detail views of one of the pointing and severing bits. Fig. 16 is a view of a pair of tool handles which may be made in my machine; and Fig. 17 illustrates one of the pointing and severing bits which may be employed to form such tool handles.

A cross head A, may be driven by pitmen A', operated by any suitable motor. To the cross head is secured a reciprocating rolling bar B, which extends through a housing C, mounted on standards C', on the bed plate D. The housing is suitably constructed to contain rollers $c$, which bear on the upper surface of the reciprocating bar B. The rollers are mounted on a shaft or shafts $c'$, against the ends of which bear set screws $c^2$, which regulate the vertical adjustment of the shafts and rollers.

To the bed plate D, is removably secured a pointing and severing bit E, the form of which is shown particularly in Figs. 13, 14 and 15. As there shown, the base $e$, is formed to fit into a corresponding recess in the bed plate D. The cutting and pointing bit proper $e'$ is longitudinally inclined from one end to a horizontal portion $x$, which extends to the opposite end of the bit. It is transversely inclined in opposite directions, its shape as an entirety being approximately that of one half of a square-based pyramid, but the sides $e^2$, are curved or hollowed so as to produce rounded points on the pins. A similar bit F, is secured to the reciprocating bar B.

A plate $A^2$, is secured to the cross-head A, and to this plate is secured a shear block G, which co-operates with a shear block H, secured to the bed plate, to sever the crop ends from the rod, and to cut the rod into proper lengths to form two pins. The shear block H, is held in place by a set screw H', between which and the base of the block is interposed a bearing plate $h$.

A gage I, is secured by screws $i$ to the bed plate D, and when the rod is fed in, its forward movement is limited by the gage, which determines the length of the pins to be severed. A series of brackets J, are formed on or secured to the front end of the bed plate, and when the rod is fed in, it rests on these brackets.

A lifter K, having inwardly-projecting arms or fingers $k$, is carried by hangers K', secured to the lever arms $K^2$, pivoted to the standards C', of the housing C. The levers at their front ends carry inwardly-projecting cam lugs $k'$, adapted to bear against cam lugs $b$ on the reciprocating bar B. The lifter is raised and lowered as the bar B, reciprocates to carry the rod from the brackets J into the path of the cutting and pointing bits E and F. The lifter is counter-balanced by weights L L', carried on levers. The lever $l$, which carries the weight L, is pivoted to a hanger $l'$, and to a link $l^2$, connected at its upper end by another link or knuckle $l^3$, to the lifter. The weight L', is carried by a lever $l^4$, pivoted to a bracket $l^5$, on the bed plate D. The front end of the lever $l^4$, bears against the rear end of the lever $l$. The weights are adjustable on the levers, and the upward movement of the rear end of the lever $l^4$, is limited by an adjustable set screw $l^6$. The counterbalancing weights return the lifter to its normal position after it has been depressed.

A carrier M, Fig. 1, is secured to reciprocating bars M', which carry at their rear ends a shaft $m$, carrying pinions $m'$, gearing with racks $m^2$, Fig. 2, on the bed plate D, and on the reciprocating bar B. The shaft $m$, is mounted in blocks $M^2$, which have a slight longitudinal movement between lugs $m^3$, projecting downwardly from the bars M'. The bars M', as they reciprocate, move in guides N, on the bed plate D, which are provided with adjustable friction blocks N', bearing against lugs or projections $n$, on the bars M'. By this construction, as the bar B, reciprocates, motion is imparted to the pinions $m'$, and as these pinions engage with both the reciprocating and the stationary racks $M^2$, a reciprocating motion will be imparted to the bars M'. As long, however, as the lugs $n$, bear against the friction blocks N', the lugs $m^3$, move toward the blocks $m^2$, without imparting a reciprocating motion to the bars M'. As the axis of the pinions is half way between the racks, the bars M', will be moved only half as fast as the bar B, and thus the desired motion is given to the carrier. The carrier, it will be observed, is provided with a groove or recess for the bar from which the pins are to be formed. When the bar is lifted into the carrier, the carrier is moved forward, causing the bar to traverse the lower or stationary bit, while the upper bit moves forward with the reciprocating rolling bar B. This upper bit, it will be understood, moves twice as fast as the carrier, so that the rod is quickly and easily pointed and severed. The carrier is made in two parts or divisions, as shown in Figs. 4 and 5, to permit the upper and lower bits to operate. After the rod is severed, it is discharged from the carrier by mechanism shown particularly in Figs. 8 and 9. As there shown, a bent lever or knuckle O, is pivoted at $o$, to each of the bars M', and extends into the carrier, its inner arm carrying a roller $o'$, adapted to bear against the pins X. A lever P, pivoted to the reciprocating bar B, on each side, carries a weight P', and its front end bears against the bent lever or knuckle O, when the bar B, has moved forward a sufficient distance. As soon as the pins X, have passed by the end of the bit E, the weighted levers depress the knuckles O, and discharge the pins X, into a channel R, formed in the bed plate D. In this channel reciprocates a sweep S, to which is secured a chain $s$, passing over a pulley $s'$, and carrying a weight S'. The sweep is also secured to a chain T, which passes over a pulley T', and is secured at $t$, to the cross head A. When the cross head moves backward, the sweep is caused to traverse the bed plate in the channel R. The sweep is provided with a flange $s^2$, which moves in a guide recess $s^3$, and the chain moves back and forth in the recess $s^4$, in the bed plate.

The rod from which the pins are formed is operated upon while it is still hot, as it comes from the rolls. The front end of the rod is first inserted in front of the shear block H, upon the brackets J. The cross head then moves forward and the blocks G and H sever the crop end from the rod. On the next forward stroke, the rod is moved transversely and stopped by the gage I, and is then cut by the blocks G and H, to form a blank, of a proper length to make two coupling pins. The blank thus formed will be supported on the brackets J, and on the next back stroke, the lugs $b$, on the bar B, engage with the lugs $k'$, on the lifting arms and force the arms downwardly as shown by dotted lines in Fig. 6, against the force of the weighted levers. As soon as the lugs $b$, pass beyond the lugs $b'$, the lifting arms are raised to their normal position, by the weights L and L', the movement of the weights being limited by the set-screw $l^6$, as before explained, and at the end of the back stroke, the several parts of the mechanism and the blank, occupy the position shown by full lines in Fig. 6. When in this position, the pin blank lies on the lifter, and the carrier M, has been brought into position over the lifter. At the beginning of the next forward stroke, the carrier is held stationary by the friction blocks N', coming in contact with lugs $n$, and the lugs $b$, pass under the lugs $k'$, on the lifting arms, and raise the lifter and the pin blank, carried thereby, into the position shown in Fig. 7, the rod being then in the carrier. As the bit F, moves over the bit E, the pin blank, is pointed and finally severed, the rod or pin blank at the same time being carried by the carrier over the bit E, and when it reaches the rear end thereof, the discharging levers O, expel the rod into the channel R. As the cross head moves backward, the sweep S, moves transversely across the machine, and discharges the pin therefrom.

It will be understood that two rods may be operated upon at the same time, that is, while one rod is being cut into pin lengths and discharged from the machine, the other rod may be put into position for being fed to the bits. By varying the formation of the bits, articles of different shapes may be made, For instance, in Figs. 16, I have illustrated a pair of tool handles which may be made by replacing the bits E and F, shown in Figs. 13, 14 and 15 by a pair of bits U, one of which is illustrated in Fig. 17.

I claim as my invention,—

1. The combination, substantially as hereinbefore set forth, of a bed plate, a pointing bit mounted thereon, a reciprocating cross head and bar carried by and reciprocating with the cross head, a pointing bit mounted thereon, a housing, pressure rollers mounted therein and bearing on the reciprocating bar, a shear block mounted on the bed plate, and a shear block mounted on the cross head.

2. The combination, substantially as hereinbefore set forth, of a stationary and a reciprocating pointing bit, and arms or levers for raising the blank into position between the bits.

3. The combination, substantially as hereinbefore set forth, of a reciprocating bar, a pointing bit carried thereby, a bed plate, a pointing bit mounted thereon, lifting arms secured to the bed plate, and means carried by the reciprocating bar for operating the lifting arms.

4. The combination, substantially as hereinbefore set forth, of a reciprocating bar, a pointing bit carried thereby, a bed plate, a pointing bit mounted therein, brackets for supporting a rod to be operated upon, lifting arms pivotally connected with the bed plate, and means carried by the reciprocating bar for operating the lifting arms.

5. The combination, substantially as hereinbefore set forth, of a reciprocating bar, a pointing bit carried thereby, a bed plate, a pointing bit mounted thereon, lifting arms pivotally connected with the bed plate, means carried by the reciprocating bar for raising and lowering the lifting arms, and counterbalancing devices connected with the lifting arms to raise them to their normal position.

6. The combination, substantially as hereinbefore set forth, of a reciprocating bar, a pointing bit carried thereby, a bed plate, a pointing bit mounted thereon, pivoted lifting arms mounted on the bed plate, and lugs carried by the lifting arms and engaging lugs carried by the reciprocating bar.

7. The combination, substantially as hereinbefore set forth, of the bed plate, a pointing bit mounted thereon, a reciprocating bar, a pointing bit carried thereby, a carrier means for operating it, and devices for feeding the bar operated upon to the carrier.

8. The combination, substantially as hereinbefore set forth, of a bed plate, a pointing bit mounted thereon, a reciprocating bar, a pointing bit carried thereby, a carrier, and connections between the carrier and the reciprocating bar for reciprocating the carrier.

9. The combination, substantially as hereinbefore set forth, of the bed plate, a pointing bit mounted thereon, a reciprocating bar, a pointing bit carried thereby, a reciprocating carrier, racks carried by the bed plate and the reciprocating bar, and pinions gearing with said racks, and connected with the carrier.

10. The combination, substantially as hereinbefore set forth, with the stationary and the reciprocating pointing bits, of a reciprocating carrier, devices for discharging the pins from the carrier, and means for operating the discharging devices.

11. The combination, substantially as hereinbefore set forth, with the stationary and the reciprocating pointing and severing bits, of a transversely moving sweep for discharging the pins from the machine.

12. The combination, substantially as hereinbefore set forth, of the bed plate, a pointing bit mounted thereon, a reciprocating bar, a pointing bit carried thereby, a carrier, means for reciprocating it, a sweep moving in a transverse channel of the bed plate, and means for operating the sweep.

13. The combination, substantially as hereinbefore set forth, with the stationary and reciprocating pointing and severing bits, a reciprocating carrier, discharging knuckles, the weighted levers acting thereon, the transversely moving sweep.

In testimony whereof I have hereunto subscribed my name.

JOHN W. R. JOHNSON.

Witnesses:
F. T. GLASGOW, Jr.,
ST. GEO. M. ANDERSON.